J. W. HALL.
MECHANISM FOR CONVERTING ROTARY TO RECIPROCATING MOVEMENT.
APPLICATION FILED MAR. 4, 1920.
1,385,002.
Patented July 19, 1921.
2 SHEETS—SHEET 2.
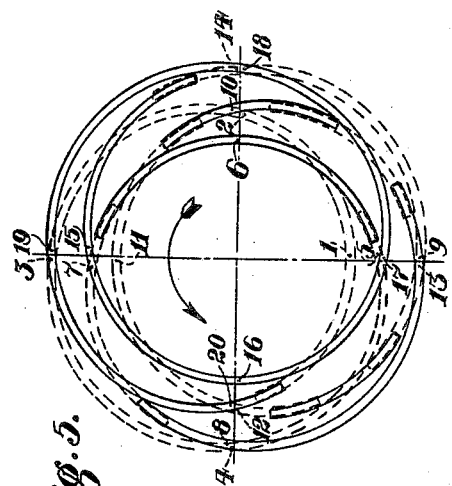
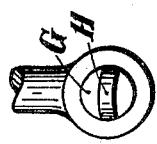
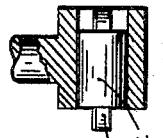
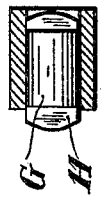
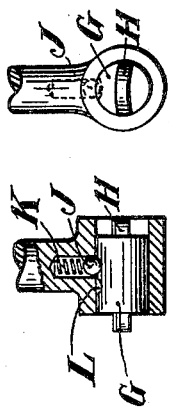
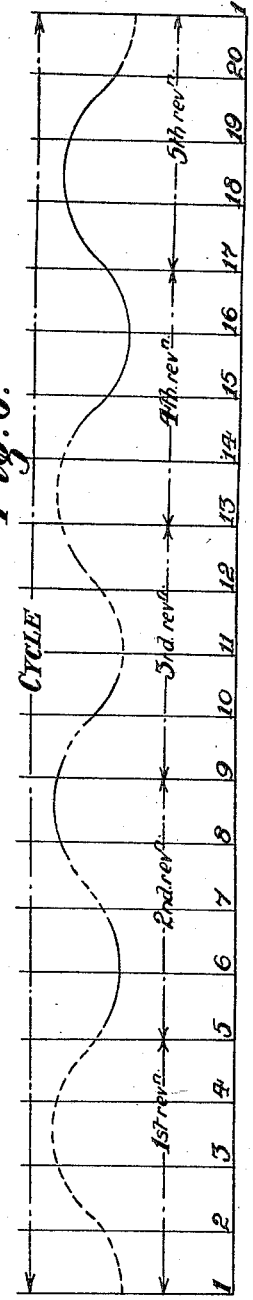
J. W. HALL.
Inventor.
per:- Sydney E. Page.
Attorney.

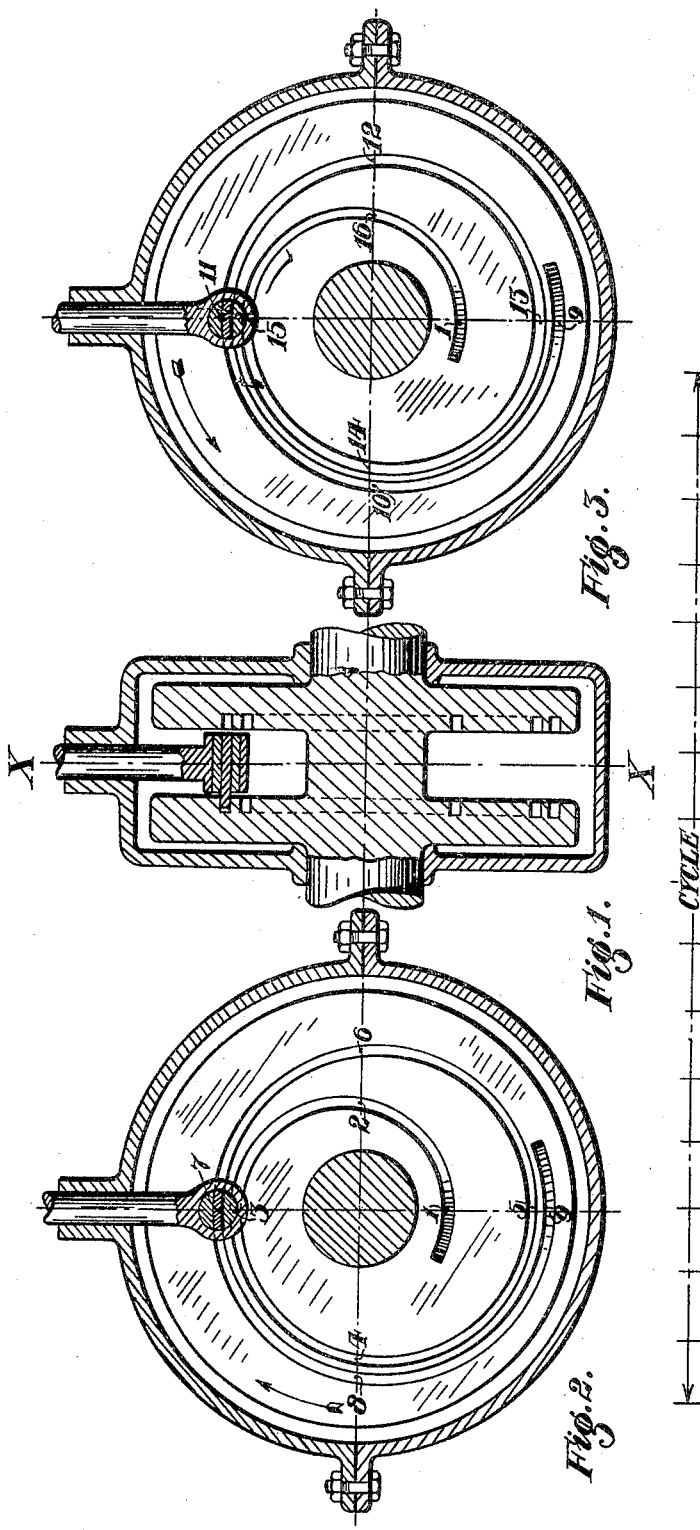

UNITED STATES PATENT OFFICE.

JOHN WALLACE HALL, OF FELTHAM, ENGLAND.

MECHANISM FOR CONVERTING ROTARY TO RECIPROCATING MOVEMENT.

1,385,002. Specification of Letters Patent. Patented July 19, 1921.

Application filed March 4, 1920. Serial No. 363,356.

*To all whom it may concern:*

Be it known that I, JOHN WALLACE HALL, a subject of the King of Great Britain, residing at Feltham, Middlesex, England, have invented certain new and useful Improvements in Mechanism for Converting Rotary to Reciprocating Movement, of which the following is a specification.

This invention relates to improved mechanism for converting rotary to reciprocating motion, and has for its object to obtain reciprocating motion which shall consist of cycles of a plurality of reciprocations of equal amplitudes and periodicity extending over an even or an odd number of revolutions, or cycles of reciprocations of predetermined varied amplitudes and/or periodicity extending over an even or an odd number of revolutions and to provide suitable mechanism for obtaining that end.

In apparatus embodying my invention is provided a pair of disks with one or more cam grooves on each disk, and a reciprocating member actuated by said cam grooves, through the medium of a shuttle pin carried by said reciprocating member, said shuttle member being in engagement with cam grooves in each disk alternately; the ends of each cam groove are provided with inclines, the inclines of one cam groove overlapping the inclines of the other cam groove to a substantial degree and the inclines being made easy. Further, by means of this invention and especially by the provision of more than one cam groove and one set of inclines on each disk, irregular motion of considerable variation may be attained in succeeding revolutions of the pair of disks, for example, say a vertical reciprocation represented by a line through a number of ordinates through a given datum line, may easily be accomplished, the said line of movement having two, three, or more hillocks representing the variation of the reciprocal movement in the cycle. The cam grooves on each of the pair of disks are either of the same or of different contour with their inclines suitably disposed to transfer the shuttle pin from one cam groove to the opposite cam groove as required; in such a disposition each cam groove may pass twice around one disk so that the variation of reciprocal movement may take place over four revolutions of the said disks. In the same way by a different shape of cam groove, still proceeding twice around one disk, but differently disposed, a line of movement having only one hillock as compared with a datum line may be attained with a portion of the cycle arranged to give no reciprocal movement at all. By the addition of an extra groove in each disk a one-and-a-half revolution cycle may give a line of movement represented by a blunted saw edge or the like having a single tooth for each one-and-a-half revolutions, the extra cam groove being required for dealing with the odd half revolution. Again, by the provision of a cam groove or cam grooves of suitable shape on each disk a different variation of movement can be obtained, say, with a three revolution cycle, the cam grooves being so disposed relatively to each other on the two disk surfaces that at the end of three revolutions the shuttle pin reaches the position of starting in the commencement of the first cam groove. To enable these several variations of movement to be successfully carried out in practice it is necessary that a satisfactory means of transmitting the movement obtained from the cam grooves may be provided, and this may be obtained by means of a cylindrical pin of substantial dimension within the crosshead but having projecting ends of thin, flat, and very slight curved shape accurately fitting within the cam grooves and formed with hardened surfaces so that very little wear takes place. Advantageously such a shuttle pin may be formed of a composite character having the central portion of a single thickness all through which is the thickness of the projecting end which passes into the cam grooves and provided with fitting portions which fill up the circular hole in the crosshead and remain permanently in position there without endwise movement.

Throughout this description when I refer to a cycle groove path I mean a path being the aggregate of the cam grooves on the two disks, the total length of which is traversed by the shuttle pin to complete one cycle groove path.

In order that my invention may be more clearly understood I will now describe the same, in various modifications, with reference to the accompanying drawings.

A simple form of my invention is diagrammatically shown in Figures 1, 2, and 3, in which Fig. 1 is a transverse section of the coöperative disks with their cam grooves indicated by dotted lines, while Fig. 2 is a sectional elevation looking from the right of line X, X in Fig. 1, and Fig. 3 is a sectional elevation looking from the left of the line X, X. Fig. 4 is a graph illustrating the movements of the reciprocating member, when its movements are constrained by the cam grooves, shown in Figs. 2 and 3. Fig. 5 illustrates a modified arrangement of cam grooves, the full lines indicating the grooves on one cam face, and the dotted lines indicating the complementary grooves on the opposing cam faces. Fig. 6 is a graph, showing the movements of the reciprocating member, constrained by the cam grooves shown in Fig. 5. Figs. 7, 8 and 9 show a modified arrangement for constructing the shuttle member, hereafter referred to, and Figs. 10 and 11 show in detail, means for maintaining the shuttle member in engagement with the cam grooves during operation.

With reference to Figs. 1, 2, 3, and 4, cam grooves designed as illustrated would produce a cycle extending over four revolutions of the disk, but by the particular arrangement shown I obtain only one complete reciprocation in the cycle, although the reciprocating member rises and falls three times.

It will thus be seen that according to my invention, while maintaining the period for one cycle constant, I can obtain any variation in the "up" or "down" strokes of the reciprocating member, for instance, the cycle may comprise only one complete reciprocation, or it may comprise two reciprocations of unequal periods, or each reciprocation in a cycle may vary in the period or amplitude of similar strokes.

Further, the number of grooves may vary, and also the number of revolutions of the crank shaft to complete a given cycle.

In Figs. 5 and 6 are shown a construction by which the number of revolutions of the disks differs from the preceding examples: and in each of these figures the full lines indicate the grooves on the disk on one side of the reciprocating member, while the dotted lines indicate the grooves on the coöperative disk: the radii by which these latter grooves are struck are slightly different from the true in order that the overlap of the complementary grooves may be more easily distinguished.

In Figs. 5 and 6 is shown a cycle groove path comprised by ten cam grooves, i. e., five cam grooves on each disk, and the cycle is completed in five revolutions of the disks. As shown in Fig. 6 there are four uniform reciprocations of the reciprocating member every five revolutions of the disks.

Referring now to Fig. 6, the part of the graph which is dotted represents the path taken by the reciprocating member when constrained to move by the cam grooves shown dotted in Fig. 5, and therefore each junction of such lines indicates a traversing movement of the shuttle pin.

It will thus be seen that by my invention I can obtain very varied movements in each cycle, and can further vary each cycle without having a complication of grooves on either cam disk, and completely eliminating the necessity for crossing such grooves on one and the same cam disk.

A further improvement of my invention enables me to use relatively narrow cam grooves, whereby many grooves can be cut on the cam disk without any complication arising, and to this end I have provided a transversely moving spindle—hereafter referred to as a shuttle pin—on the coöperating extremity of the reciprocating member, and characterized by the provision of reduced extremities.

In Figs. 1, 2 and 3 I show a construction in which the shuttle member is formed in a composite manner having the central portion of a single thickness all through which is the thickness of the projecting ends which passes into the cam grooves and is provided with fitting portions which fill up the circular hole in the extremity of the reciprocating member.

A modified arrangement is shown in elevation, plan, and end views in Figs. 7, 8 and 9 respectively. In such construction the shuttle pin is preferably formed as a cylindrical member G having projecting ends H of thin, flat, or very slightly curved shape to accurately fit within the grooves on the cam disks and formed with hardened surfaces so that very little wear takes place.

The transverse position of the shuttle pin may be fixed in the extreme positions by a spring K and ball J, as indicated in Figs. 10 and 11, in order to prevent involuntary disengagement of the shuttle pin with the cam groove.

By the aid of this invention movement of almost any desired variation may be obtained in a simple manner throughout a cycle of any length from one to four or even more revolutions with two disks, and from one to say four grooves on each cam surface. Especial application of the invention to the working of slide valve gear for four stroke internal combustion engines may be obtained by this means and without the use of rollers, gears, or extra shafts. It should be noted that none of the grooves in a particular cam disk according to this invention need intersect another, and that therefore a thin end to the shuttle pin will operate without difficulty, and that owing to the slight difference in curvature as between one radius of groove and another substantially no play is afforded according to this construction, and very accurate repetition of movement may therefore be achieved.

The thin ends of the shuttle pin before mentioned allow of them fitting grooves with variable curvature by reason of the slight give due to their thin section. The thin ends of the shuttle pin may also be sloped to suit inclines at the end of the cam grooves, as shown in Fig. 8.

In the foregoing description and in the following claims, I refer to the amplitude, periodicity, and stroke of the reciprocating member; the interpretation of such term is to be found by reference to the graphs and not in the actual movement of the reciprocated member. The amplitude of a reciprocation is the distance between the maximum and minimum height of the curve in a cycle; the period is measured by the distance between two such maxima or minima, and the stroke is measured along a line joining a maximum to a minimum, or vice versa.

Further, by a cam groove of one convolution I mean that the path extends through 360° and is not a circle.

By constructions arranged according to the present invention, I provide a single cycle groove path, comprised by cam grooves on the two disks, so constructed and arranged that during the cycle the reciprocations of different amplitudes and/or different periods may be obtained.

I claim:—

1. Means for converting rotary motion into cycles of a plurality of reciprocating motions of equal amplitude and periodicity extending over any predetermined number of revolutions, comprising a pair of co-axial, revolubly mounted, parallel disks having their opposed faces formed with cam grooves, so that the grooves on the two faces are complementary to form a groove path once traversible during the predetermined number of revolutions, an incline at each extremity of each cam groove, a reciprocable member disposed between said disks, a shuttle member carried transversely by said reciprocable member, and formed with a tongue at each extremity adapted to be alternately projected into the cam grooves on one face by the said inclines on the other face, and means for simultaneously driving the disks.

2. Means for converting rotary motion into cycles of irregular reciprocating motion comprising a pair of coaxial, revolubly mounted, parallel disks having their opposed faces formed with cam grooves, so that the grooves on the two faces are complementary to form a groove path, once traversable during a predetermined number of revolutions of the disk members, an incline at each extremity of each cam groove, a reciprocable member disposed between the said disks, a shuttle member carried transversely by said reciprocable member, and formed with a tongue at each extremity adapted to be alternately projected into the cam grooves on one face by the said inclines on the other face, and means for simultaneously driving the disks.

3. Means for converting rotary motion into cycles of a plurality of reciprocating motions of equal amplitude and periodicity extending over a predetermined number of revolutions, comprising a pair of co-axial, revolubly mounted, parallel disks having their opposed faces formed with cam grooves, so that the grooves on the two faces are complementary to form a groove path once traversable during the predetermined number of revolutions, an incline at each extremity of each cam groove, a reciprocable member disposed between said disks, a shuttle member carried transversely by said reciprocable member, and formed with a tongue at each extremity adapted to be alternately projected into the cam grooves on one face by the said inclines on the other face, means for simultaneously driving the disks, and means for retaining the shuttle member in coöperative engagement with each cam groove, comprising a spring pressed ball member, and a recess formed on each side of the middle portion of the shuttle member, so that in each position of the shuttle member the ball is pressed into one of the recesses.

4. Means for converting rotary motion into cycles of irregular reciprocating motion comprising a pair of coaxial, revolubly mounted, parallel disks having their opposed faces formed with cam grooves, so that the grooves on the two faces are complementary to form a groove path, once traversable during a predetermined number of revolutions of the disk members, an incline at each extremity of each cam groove, a reciprocable member disposed between the said disks, a shuttle member carried transversely by said reciprocable member, and formed with a tongue at each extremity adapted to be alternately projected into the cam grooves on one face by the said inclines on the other face, means for simultaneously driving the disks, and means for retaining the shuttle member in coöperative engagement with each cam groove, comprising a spring-pressed ball member, and a recess formed on each side of the middle portion of the shuttle member, so that in each position of the shuttle member the ball is pressed into one of the recesses.

5. The transversely movable shuttle member comprising a central portion of single thickness throughout and comprising terminal tongues and a segmental portion on each side of the central portion as set forth.

In testimony whereof I affix my signature.

JOHN WALLACE HALL.

Witnesses:
J. OSWALD FARRER,
GEO. E. EMMETT.